United States Patent
Chalopin et al.

(10) Patent No.: US 7,613,208 B2
(45) Date of Patent: Nov. 3, 2009

(54) COMMUNICATION INTERFACE

(75) Inventors: Herve Chalopin, Aubagne (FR);
Laurent Tabaries, Aubagne (FR)

(73) Assignee: STMicroelectronics, Montrouge (FR)

( * ) Notice: Subject to any disclaimer, the term of this patent is extended or adjusted under 35 U.S.C. 154(b) by 577 days.

(21) Appl. No.: 11/218,349

(22) Filed: Sep. 1, 2005

(65) Prior Publication Data
US 2006/0056450 A1    Mar. 16, 2006

(30) Foreign Application Priority Data
Sep. 3, 2004   (FR) .................................. 04 09363

(51) Int. Cl.
*H04L 12/66* (2006.01)
(52) U.S. Cl. .................................... 370/466
(58) Field of Classification Search ................ 370/465, 370/466, 467
See application file for complete search history.

(56) References Cited

U.S. PATENT DOCUMENTS

| | | | | |
|---|---|---|---|---|
| 5,239,544 A | * | 8/1993 | Balzano et al. | 370/465 |
| 5,606,707 A | * | 2/1997 | Tomassi et al. | 345/418 |
| 6,481,532 B1 | * | 11/2002 | Ando | 187/247 |
| 6,549,966 B1 | | 4/2003 | Dickens et al. | 710/300 |
| 2002/0169906 A1 | | 11/2002 | Kondo et al. | |
| 2003/0081666 A1 | * | 5/2003 | Nah | 375/222 |

FOREIGN PATENT DOCUMENTS

| | | |
|---|---|---|
| CA | 2 303 565 | 10/2001 |
| EP | 0 629 956 A2 | 12/1994 |
| EP | 0 883 083 A1 | 12/1998 |
| JP | 11-88380 | 3/1999 |
| JP | 11-88459 | 3/1999 |

* cited by examiner

*Primary Examiner*—Melvin Marcelo
(74) *Attorney, Agent, or Firm*—Lisa K. Jorgenson; Timothy L. Boller; Seed IP Law Group PLLC

(57) ABSTRACT

An interface communicates between two communication buses which use at least two different protocols. The interface includes a volatile memory having at least two access ports and including two transcoding circuits, each transcoding circuit being specific to each of the protocols to be interfaced.

16 Claims, 3 Drawing Sheets

COMMUNICATION INTERFACE

BACKGROUND OF THE INVENTION

1. Field of the Invention

The invention pertains to a communication interface. More particularly, a communication interface between at least two communication buses using two different communication protocols.

2. Description of the Related Art

In the world of multimedia, data transfers between two or more appliances are becoming ever more numerous. The appliances concerned may be mass-market products such as video recorders, televisions, DVD readers, HiFi systems and the like or belong to the computing world and in particular to the world of personal computers (hereinbelow PC). The tendency at present is to make all the appliances intercommunicate. However, the transfer of data requires bigger or smaller throughputs depending on the type of appliance and depending on the type of data. Communication protocols that are more or less dedicated to the various appliances or types of appliances are used. At present, the only appliance that is truly interconnectable with substantially all the others is the PC, if the latter has a specific interface for each communication protocol.

However, certain personal computers, of portable type, have a reduced physical size which does not necessarily allow the integration of a new communication interface and they do not necessarily have all the communication interfaces available on the market.

Moreover, certain appliances are rather more dedicated to the computing world and others rather more dedicated to the world of mass-market products and it is difficult to interconnect appliances belonging to these two worlds without going by way of a PC.

At present, if one wishes to interface a device operating according to a communication protocol dedicated to the world of the PC to another device dedicated to the world of mass-market products, the interfacing is done by way of a PC, such as, for example, represented diagrammatically in FIG. 1. The PC represented comprises mainly a central processing unit (CPU) 1 having a central memory 2 coupled to the CPU 1 by a bus 3 and having a first communication interface 4 making it possible to communicate according to a first protocol and a second communication interface 5 making it possible to communicate according to a second protocol. A PC thus equipped allows a dialogue to be conducted between two appliances operating respectively according to the two protocols, for example the universal serial bus protocol, better known by the name of USB standard (standing for Universal Serial Bus) and the second protocol being, for example, the IEEE 1394 protocol. A message received in compliance with one of the protocols by one of the interfaces 4 or 5 causes the issuing of an interrupt destined for the CPU 1 which will search for a subprogram previously loaded into the central memory 2. The subprogram will make it possible to temporarily store the data received in the memory 2, then to send them to the other interface 5 or 4 so as to retransmit them according to the other protocol.

As indicated previously, the PC must be furnished with a specific subprogram for carrying out the transcoding between the two protocols. Such a subprogram then neutralizes the use of the communication interfaces 4 and 5 allowing the PC to dialogue by way of these interfaces. It is then necessary for a user to have a minimum of knowledge to be able to change the parameter settings of these interfaces 4 and 5 depending on the use that one wishes to make thereof.

This state of the art renders a simple interconnection between, for example, a music player and a digital video recorder relatively complex. Moreover, not everybody has his own PC.

BRIEF SUMMARY OF THE INVENTION

One embodiment of the invention proposes an interface between two communication buses which use at least two different protocols. The interface is built around a volatile memory comprising at least two access ports which are coupled to two transcoding circuits. Each transcoding circuit is specific to each of the protocols to be interfaced. The use of a memory with at least two ports, each port being coupled to a transcoding circuit, makes it possible to dispense with complex memory management, thereby vastly simplifying the construction of the interface.

One embodiment of the invention is a communication interface between at least one first and one second communication bus using respectively a first and a second protocol, each protocol having specifications suitable for the formatting and packetizing of data. The interface comprises a memory, a first transcoding circuit and a second transcoding circuit. The memory comprises at least one first and one second access port, each of the ports being controllable independently of one another. The first transcoding circuit supports the first protocol, and being coupled to the first access port of the memory. The first transcoding circuit makes it possible to packetize and to format data situated in the memory so as to transmit them to the first bus according to the specifications of the first protocol, and/or makes it possible to deformat and depacketize data received from the first bus according to the specifications of the first protocol so as to store them in the memory. The second transcoding circuit supports the second protocol, and being coupled to the second access port of the memory. The second transcoding circuit makes it possible to packetize and to format data situated in the memory so as to transmit them to the second bus according to the specifications of the second protocol, and/or makes it possible to deformat and depacketize data received from the second bus according to the specifications of the second protocol so as to store them in the memory.

Preferably, a drive circuit coupled to the first and second transcoding circuits ensures synchronization between the two circuits.

According to a particular embodiment, the interface comprises N communication buses using N communication protocols, each protocol having specifications suitable for formatting and packetization, and N transcoding circuits respectively supporting each of the N protocols, each transcoding circuit making it possible to packetize and to format data so as to transmit them by way of one of the N buses according to the specifications of one of the N protocols, and/or making it possible to deformat and depacketize data received from one of the N buses according to the specifications of the first protocol. The memory comprises N ports, each port of the said memory being coupled to one of the N transcoding circuits, N being an integer greater than two. The control circuit is furnished with means of selection for selectively controlling the transcoding circuits to be implemented so as to share one and the same group of data by way of the memory.

One embodiment of the invention is also an integrated circuit comprising an interface such as defined above.

According to another embodiment, the invention is a method of interfacing between at least one first and one second communication bus using respectively a first and a second communication protocol, each protocol having specifications suitable for the formatting and packetizing of data. The method comprises the following steps: reception by a first transcoding circuit supporting the first protocol of data originating from the first bus; deformatting, depacketization and decoding of the data received, by the first transcoding circuit according to the specifications of the first protocol; storage of the data decoded in a memory by way of a first port of the said memory; reading of the data decoded by a second transcoding circuit supporting the second protocol, the reading being performed by way of a second port of the memory; coding, packetization and formatting of the data read according to the specifications of the second protocol, by the second transcoding circuit; and sending over the second bus of the data formatted according to the second protocol.

Preferably, the first transcoding circuit also stores in the memory information supplementing the data. A drive circuit synchronizes the second transcoding circuit so that the latter triggers the packetization and formatting coding step only after the first transcoding circuit has stored in the memory the data sufficient for a formatting according to the second protocol. The interfacing between the two buses is carried out selectively among N buses coupled to N transcoding circuits each operating in compliance with a different communication protocol chosen from among N protocols, the N transcoding circuits exchanging data between themselves by way of a memory having N ports, each port being coupled to one of the N transcoding circuits, N being greater than or equal to two, the control circuit selecting at least one transcoding circuit to be implemented.

BRIEF DESCRIPTION OF THE DRAWINGS

The invention will be better understood and other features and advantages will become apparent on reading the description given with reference to the appended drawings among which.

DETAILED DESCRIPTION OF PREFERRED EMBODIMENTS

Figure 1:
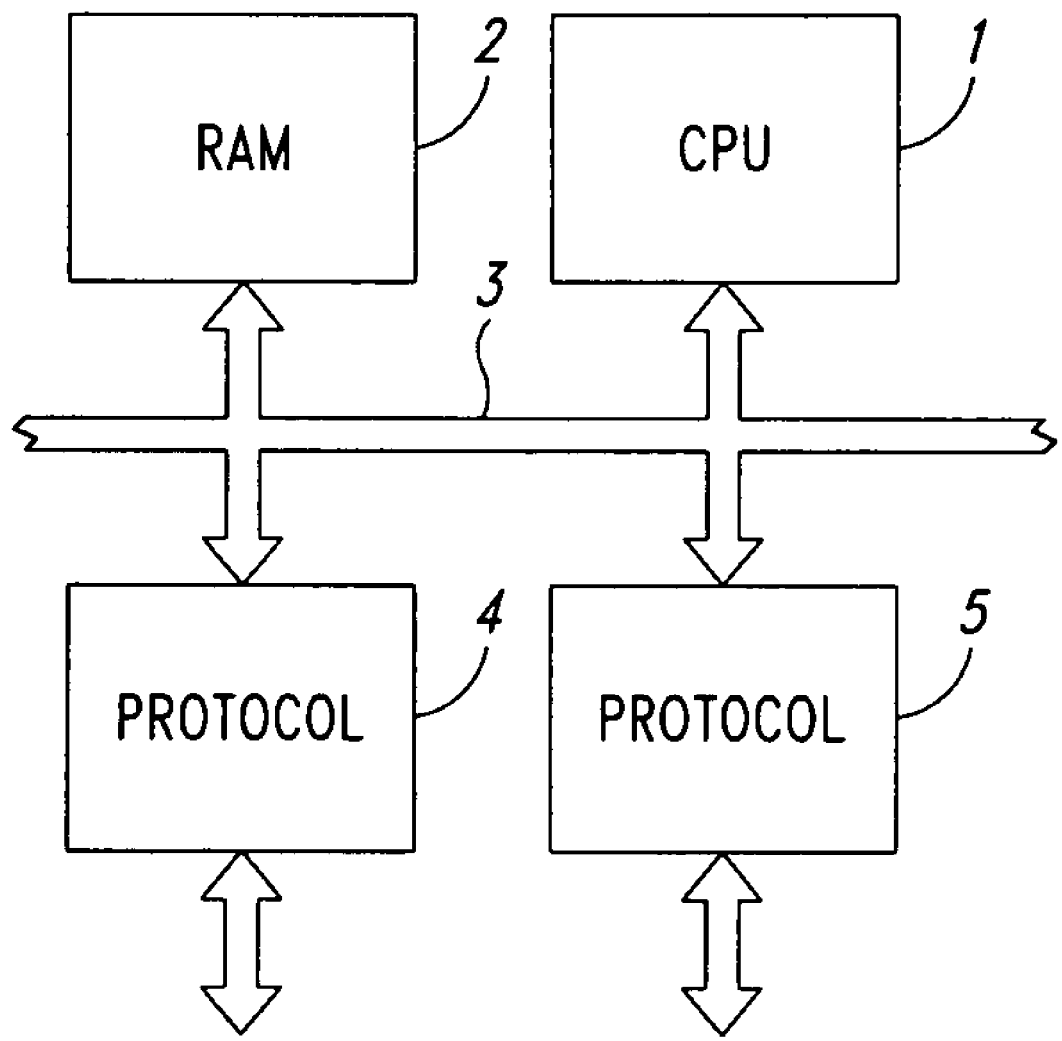
FIG. 1 represents a personal computer making it possible to interface two protocols according to the state of the art.
Figure 2:
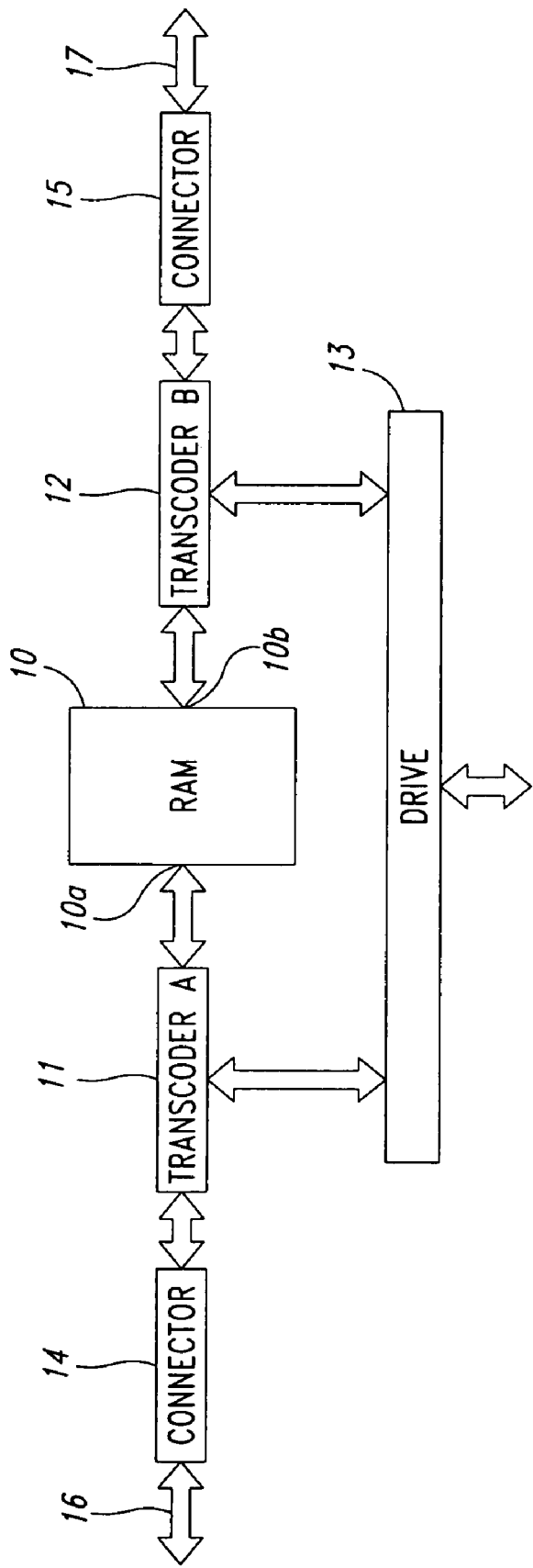
FIG. 2 shows a first embodiment of an interface device between two protocols according to the invention.

The interface represented in FIG. 2 comprises a dual port memory 10, two transcoding circuits 11 and 12 connected respectively to each of two ports 10A, 10B of the memory 10, a drive circuit 13 coupled to the two transcoding circuits 11 and 12, and two connectors 14 and 15 connected respectively to the two transcoding circuits 11 and 12. The dual port memory 10 is a known circuit having a central memory area and two input/output ports. Each of the input/output ports makes it possible to drive the memory 10 independently of the other port.

Each transcoding circuit 11 and 12 is dedicated to a communication protocol. The transcoding circuit 11 is dedicated to a protocol A, for example a protocol defined according to the USB standard and the transcoding circuit 12 is dedicated to a protocol B, for example a protocol defined according to the IEEE 1394 standard. The person skilled in the art may refer, on the one hand to the USB standard, and on the other hand to the IEEE 1394 standard for further details regarding the two protocols and the construction of the two transcoding circuits 11 and 12. Each transcoding circuit 11 and 12 is respectively connected to a connector 14 and 15 so as to be able to be linked to a respective communication bus 16, 17 dedicated to the protocol supported by the transcoding circuit. Each transcoding circuit 11 and 12 is able to receive and/or send data according to the protocol to which it is dedicated. Each transcoding circuit 11 and 12 is also able to decode the data so as to write the said data to the memory in a decoded form and/or to read data from the memory 10 so as to encode them and then send them in a format corresponding to the protocol to which it is dedicated.

The term decoding should be understood to mean on the one hand the depacketization of the data, the deformatting and possible decoding according to an error correction code. Likewise, the term encoding should be understood to mean on the one hand the packetization of the data, formatting and possible coding according to an error correction code.

In addition to the data, the protocols can use supplementary information, such as the throughput, the data type transmitted, the address of the device for which the data is intended, etc. This supplementary information is also stored in the memory 10 so as to be adapted from one standard to the other when this is possible and/or is of interest.

The drive circuit 13 serves to intersynchronize the transcoding circuits 11 and 12. The drive circuit 13 receives information relating to the number of data written and read to and from the memory 10 by the transcoding circuits 11 and 12. Addresses can be exchanged between the transcoding circuits 11 and 12 and the drive circuit 13 so as to manage the occupancy of the memory and also areas dedicated to the data transmitted and to the supplementary information. Construction of such a drive circuit is well within the ordinary skill in the art in view of the functional descriptions discussed herein.

The manner in which the interface operates will now be indicated. If data are received by the transcoding circuit 11 via the connector 14, the transcoding interface 11 will indicate to the drive circuit 13 that the former is receiving data. On the basis of the packet of data received, the transcoding circuit 11 extracts all the information supplementary to the data and writes it to an area of the memory 10 dedicated to this type of information. The data packet is thereafter descrambled, possibly decoded if the protocol uses an error correcting code and the raw data are thereafter written to a data area of the memory 10. At the end of the reception and decoding of each packet received by the transcoding circuit 11, the drive circuit 13 is informed of the number of data present in the memory 10. When the memory contains a sufficient number of data to send a packet of data in compliance with the protocol B, the drive circuit 13 triggers the encoding of the transcoding circuit 12. The transcoding circuit 12 will read from the memory 10 the supplementary information allowing the encoding, for example the information regarding type of data, throughput, etc. necessary for protocol B. The transcoding circuit 12 will create the header of the data packet with a view to a transmission over the second bus by way of the connector 15. The data are thereafter read by the transcoding circuit 12 in the memory 10, these data are encoded, placed into packets and forwarded over the second communication bus. When a data packet is sent by the transcoding circuit 12, the latter indicates same to the drive circuit 13 which can in its turn indicate to the transcoding circuit 11 that the corresponding memory space is free again.

In the case of a transfer going from the second bus to the first bus, the manner of operation is reversed. Thus the transcoding circuit 12 will depacketize the data so as to write to the memory 10, on the one hand, the data and, on the other hand, the supplementary communication information. The drive circuit 13 triggers the packetization by the transcoding circuit 11 so as to send the data over the first bus by way of the connector 14.

The drive circuit 13 can moreover have an external connection making it possible to specify whether the interface behaves in a monodirectional or bidirectional manner or whether particular parameters need to be taken into account by one of the transcoding circuits 11 or 12.

Such an interface may be simply interconnected between a communication port according to a protocol A and a communication port according to a protocol B via prospective buses. In practice, the interface can be embodied with the aid of a single integrated circuit including the memory 10, the two transcoding circuits 11 and 12 and the drive circuit 13. Two external connectors 14 and 15 are linked to the integrated circuit so as to be able to connect the buses specific to each protocol. The circuit is powered directly by the buses which have a power feed as is the case for example for the USB and IEEE 1394 standards. The assembly then simply becomes a small device for interconnecting a cable of relatively reduced size that is easy for any user to use.

A first embodiment has been presented which makes it possible to interface two communication protocols over serial buses such as defined by the USB and IEEE 1394 standards; however, other protocols, for example a protocol for exchanging data over a parallel bus, may require interconnections with these two protocols. Such a device does not make it possible to interconnect more than two protocols.

Figure 3:
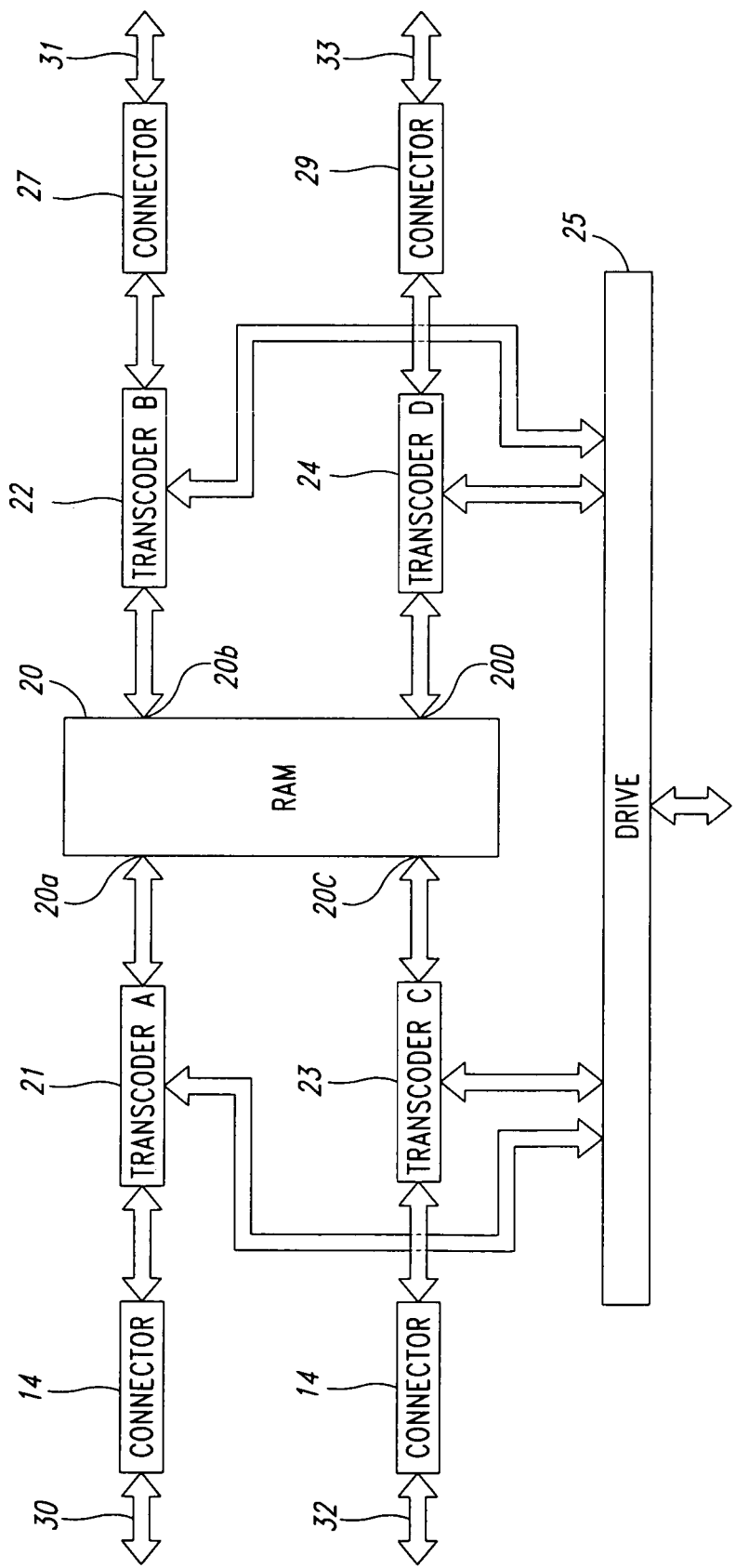
FIG. 3 shows a second embodiment of an interface device according to the invention.

A second embodiment represented in FIG. 3 generalizes the principle and makes it possible to have a relatively compact device making it possible to interface several types of protocols. The interface of FIG. 3 comprises a multiport memory 20, for example a four-port memory 20, four transcoding circuits 21 to 24 operating according to four different protocols A, B, C and D and respectively coupled to each port 20A-20D of the memory 20, a drive circuit 25 coupled to the four transcoding circuits, and four connectors 26 to 29 respectively coupled to the four transcoding circuits 21 to 24. The drive circuit 25 is here necessarily furnished with means of selection which make it possible to select those buses 30, 31, 32, 33 between which a communication is performed. The manner of operation of such a circuit is the same as that of the interface of FIG. 2. However, prior to a transfer, the user may indicate to the drive circuit 25 between which of the transcoding circuits 21 to 24 the exchange of information is to be made by way of the memory 20.

The user may plug cables into the corresponding connectors 26 to 29. The selection may be made, either with the aid of a switch, or by detecting the presence of a cable plugged into one of the connectors. Power is supplied for example by recovering a supply voltage from a connector. Here again, a simple integrated circuit can integrate the memory 20 as well as the four transcoding circuits 21 to 24 and the drive circuit 25, a package containing the integrated circuit may comprise the four connectors 26 to 29 and also a switch to indicate to the drive circuit which connection is the one to be made.

All of the above U.S. patents, U.S. patent application publications, U.S. patent applications, foreign patents, foreign patent applications and non-patent publications referred to in this specification and/or listed in the Application Data Sheetare incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A communication interface between a first and a second communication bus using respectively a first and a second protocol, each protocol having specifications suitable for the coding of data, said communication interface comprising:
   a memory comprising a first and a second access port, each of the ports being controllable independently of one another;
   a first transcoding circuit supporting the first protocol, and being coupled to the first access port of the memory, the first transcoding circuit making it possible to encode data situated in the memory so as to transmit them to the first bus according to the specifications of the first protocol, and/or making it possible to decode data received from the first bus according to the specifications of the first protocol so as to store them in the memory;
   a second transcoding circuit supporting the second protocol, and being coupled to the second access port of the memory, the second transcoding circuit making it possible to encode data situated in the memory so as to transmit them to the second bus according to the specifications of the second protocol, and/or making it possible to decode data received from the second bus according to the specifications of the second protocol so as to store them in the memory; and
   a control circuit coupled to the first and second transcoding circuits for ensuring synchronization between the transcoding circuits, so that the second transcoding circuit triggers the data encoding only after the first transcoding circuit has stored in the memory the data sufficient for a formatting according to the second protocol.

2. The interface according to claim 1, comprising N communication buses using N communication protocols, each protocol having specifications suitable for data encoding, and N transcoding circuits respectively supporting the N protocols, each transcoding circuit making it possible to packetize and to format data so as to transmit them by way of one of the N buses according to the specifications of one of the N protocols, and/or making it possible to decode data received from one of the N buses according to the specifications of the first protocol, in which the memory comprises N ports, each port of the memory being coupled to one of the N transcoding circuits, N being an integer greater than two, and in which the control circuit is furnished with means of selection for selectively controlling the transcoding circuits to be implemented so as to share a group of data by way of the memory.

3. The interface according to claim 1, wherein at least one of the protocols is a serial communication protocol.

4. The interface according to claim 3, wherein one of the protocols complies with the IEEE 1394 standard and/or one of the protocols complies with the USB standard.

5. An integrated circuit, comprising:
   a communication interface between a first and a second communication bus using respectively a first and a second protocol, each protocol having specifications suitable for the formatting and packetizing of data, said communication interface including:
   a memory having a first and a second access port, each of the ports being controllable independently of one another;
   a first transcoding circuit supporting the first protocol, and being coupled to the first access port of the memory, the first transcoding circuit making it possible to encode data situated in the memory so as to transmit them to the first bus according to the specifications of the first protocol, and/or making it possible to decode data received from the first bus according to the specifications of the first protocol so as to store them in the memory;

a second transcoding circuit supporting the second protocol, and being coupled to the second access port of the memory, the second transcoding circuit making it possible to encode data situated in the memory so as to transmit them to the second bus according to the specifications of the second protocol, and/or making it possible to decode data received from the second bus according to the specifications of the second protocol so as to store them in the memory; and a control circuit coupled to the first and second transcoding circuits for ensuring synchronization between the transcoding circuits, so that the second transcoding circuit triggers the data encoding only after the first transcoding circuit has stored in the memory the data sufficient for a formatting according to the second protocol.

6. The integrated circuit according to claim 5, wherein the interface is structured to interface between N communication buses using N communication protocols, each protocol having specifications suitable for data encoding, the interface including N transcoding circuits respectively supporting each of the N protocols, each transcoding circuit making it possible encode data so as to transmit them by way of one of the N buses according to the specifications of one of the N protocols, and/or making it possible to decode data received from one of the N buses according to the specifications of the first protocol, in which the memory comprises N ports, each port of the said memory being coupled to one of the N transcoding circuits, N being an integer greater than two, and in which the control circuit has means of selection for selectively controlling the transcoding circuits to be implemented so as to share one and the same group of data by way of the memory.

7. The integrated circuit according to claim 5, wherein at least one of the protocols is a serial communication protocol.

8. The integrated circuit according to claim 7, wherein one of the protocols complies with the IEEE 1394 standard and/or one of the protocols complies with the USB standard.

9. A method of interfacing between a first and a second communication bus using respectively a first and a second communication protocol, each protocol having specifications suitable for data encoding, said method comprising the following steps of:

receiving, by a first transcoding circuit supporting the first protocol, data originating from the first bus;

decoding the data received, by the first transcoding circuit according to the specifications of the first protocol;

storing the decoded data in a memory by way of a first port of the memory;

reading the decoded data by a second transcoding circuit supporting the second protocol, the reading being performed by way of a second port of the memory;

coding the data read according to the specifications of the second protocol, by the second transcoding circuit; and sending over the second bus the data formatted according to the second protocol, wherein a control circuit synchronizes the second transcoding circuit so that the second transcoding circuit triggers the coding step only after the first transcoding circuit has stored in the memory the data sufficient for a formatting according to the second protocol.

10. The method according to claim 9, wherein the first transcoding circuit also stores in the memory information supplementing the data.

11. The method according to claim 9, wherein the interfacing between the two buses is carried out selectively among N buses coupled to N transcoding circuits each operating in compliance with a different communication protocol chosen from among N protocols, the N transcoding circuits exchanging data between themselves by way of a memory having N ports, each port being coupled to one of the N transcoding circuits, N being greater than or equal to two, the control circuit selecting at least one transcoding circuit to be implemented.

12. The method according to claim 9, wherein at least one of the protocols is a serial communication protocol.

13. The method according to claim 12, wherein one of the protocols complies with the IEEE 1394 standard and/or one of the protocols complies with the USB standard.

14. A communication interface between first and second communication buses respectively using first and second protocols, the communication interface comprising:

a memory including first and second access ports, each of the ports being controllable independently of one another;

a first transcoding circuit supporting the first protocol and being coupled to the first access port, the first transcoding circuit being structured to transcode data for transmission between the memory and the first communication bus;

a second transcoding circuit supporting the second protocol, and being coupled to the second access port of the memory, the second transcoding circuit being structured to transcode data for transmission between the memory and the second communication bus; and a control circuit structured to synchronize the second transcoding circuit and trigger the second transcoding circuit to transcode the data only after the first transcoding circuit has stored in the memory the data sufficient for a formatting according to the second protocol.

15. The interface of claim 14, wherein:

the communication buses are of N communication buses using N communication protocols, each protocol having specifications suitable for data encoding;

the first and second transcoding circuits are of N transcoding circuits respectively supporting the N protocols, each transcoding circuit being structured to transcode data for transmission between a respective one of the communication buses and the memory; and the memory comprises N ports including the first and second ports, each port of the memory being coupled to a respective one of the N transcoding circuits, N being an integer greater than two.

16. The interface of claim 14, wherein the memory and transcoding circuits are implemented together in an integrated circuit.

\* \* \* \* \*

UNITED STATES PATENT AND TRADEMARK OFFICE
CERTIFICATE OF CORRECTION

PATENT NO. : 7,613,208 B2  Page 1 of 1
APPLICATION NO. : 11/218349
DATED : November 3, 2009
INVENTOR(S) : Herve Chalopin et al.

It is certified that error appears in the above-identified patent and that said Letters Patent is hereby corrected as shown below:

Title Page Item (73)
"Assignee: STMicroelectronics, Montrouge (FR)" should read --Assignee: STMicroelectronics S.A., Montrouge (FR)--.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO.         : 7,613,208 B2
APPLICATION NO.    : 11/218349
DATED              : November 3, 2009
INVENTOR(S)        : Chalopin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1005 days.

Signed and Sealed this

Nineteenth Day of October, 2010

David J. Kappos
*Director of the United States Patent and Trademark Office*